J. KAHN.
SHAFT HANGER SUPPORT.
APPLICATION FILED AUG. 27, 1909.

992,877.

Patented May 23, 1911.

Witnesses
O. B. Baenziger.
E. M. Brown.

Inventor
Julius Kahn
by Edward N. Pagels

UNITED STATES PATENT OFFICE.

JULIUS KAHN, OF DETROIT, MICHIGAN, ASSIGNOR TO TRUSSED CONCRETE STEEL COMPANY, OF DETROIT, MICHIGAN, A CORPORATION OF MICHIGAN.

SHAFT-HANGER SUPPORT.

992,877.

Specification of Letters Patent.

Patented May 23, 1911.

Application filed August 27, 1909. Serial No. 514,857.

*To all whom it may concern:*

Be it known that I, JULIUS KAHN, a citizen of the United States, and a resident of Detroit, in the county of Wayne and State of Michigan, have invented a new and Improved Shaft-Hanger Support, of which the following is a specification.

This invention relates to means adapted to be embedded in the lower sides of beams, floors, ceilings and other structures of concrete to furnish connections to support shaft hangers and other machinery, and the object of my improvement is to provide a hanger which shall be simple in construction, easily assembled, and of great strength.

Figure 1:
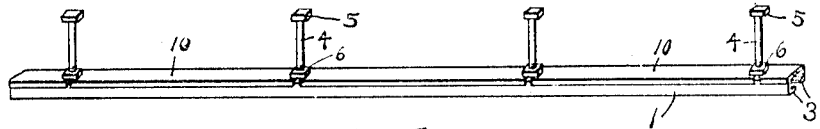
Figure 2:
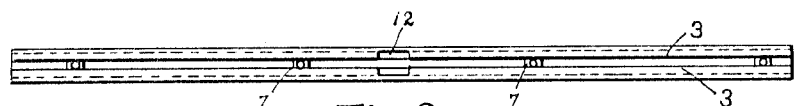
Figure 3:
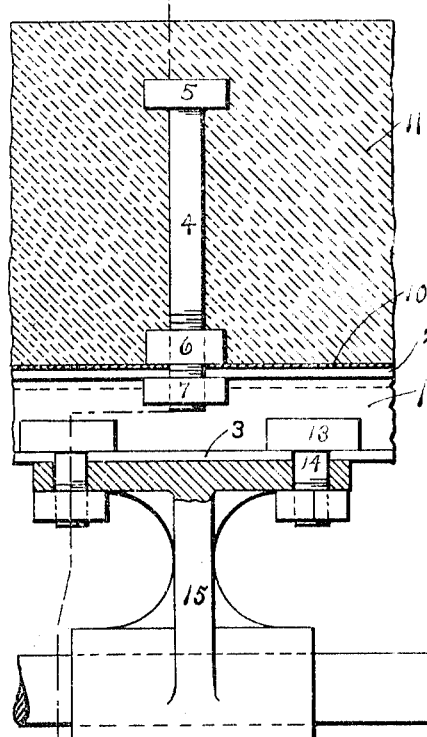
Figure 4:
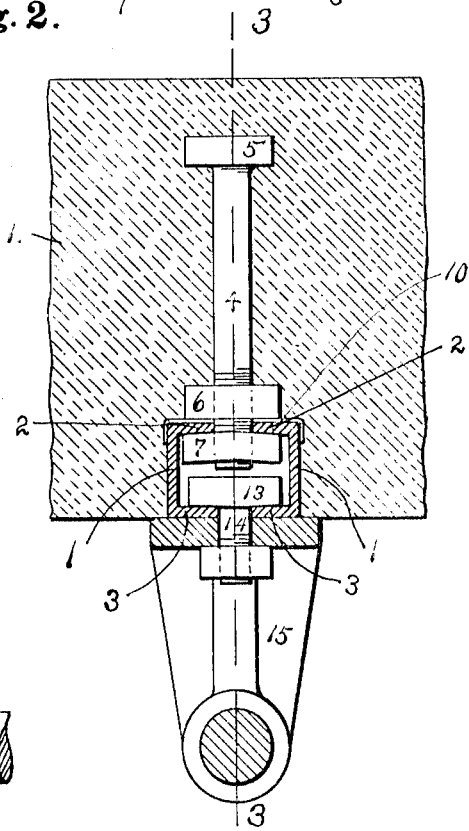

In the accompanying drawings, Figure 1 is a perspective view of this improved shaft hanger support. Fig. 2 is an inverted plan of the same. Fig. 3 is a cross section on the line 3—3 of Fig. 4. Fig. 4 is a cross section on the line 4—4 of Fig. 3.

Similar reference characters refer to like parts throughout the several views.

The increased use of reinforced concrete has introduced the same into factory construction where floors and beams are made of this material to a large extent. As the material becomes extremely hard, it is very difficult to drill holes through the same for bolts to support shaft-hangers and other machinery. Means to permit the ready attaching and detaching of machinery are therefore embedded in the concrete floors and girders before the concrete has hardened, and the drawings show an improved device for such purpose.

The two parallel, rolled-steel channels 1 have inturned flanges 2 and 3. Bolts 4 have any desired enlargements 5 at their upper ends and are threaded at their lower ends to receive the nuts 6 and 7. The nut 7 may be formed to fit the inner faces of the flanges 2 of the channels. Extending over the upper faces of the channels, and short distances down the sides if desired, are the plates 10 which hold the channels positioned and also prevent the concrete from filling the space between the channels.

The supports are assembled by placing the plates 10 over a pair of channels, screwing the nuts 6 up onto the bolts and then screwing the bolts into the nuts 7, held in proper position. The nuts 6 are then screwed down to lock the parts together. The finished supports can be made of any length, and the dimensions of the angles and the sizes and spacing of the bolts 4 will depend upon the load to be carried.

The finished hangers are properly placed on the false-work and concrete 11 is molded around them in the usual manner. The lower flanges 3 of the channels are provided with notches 12, where necessary, to permit the introduction of the heads 13 of the hanger bolts 14, which secure hangers 15 of other machinery in position. The concrete, after hardening, will prevent the channels from spreading so the plates 10 need be of but thin metal. As the parts can readily be assembled they can be slipped in bundles and thus avoid damage.

Having now explained my improvements, what I claim as my invention and desire to secure by Letters Patent is:—

1. A shaft hanger support, comprising channel bars having inturned flanges, plates extending along above the channel bars and having their edges turned down to hold the channel bars parallel to each other, bolts extending upward from between the channel bars, nuts on the bolts above and below the upper flanges of the channel bars to hold the parts in position and means carried by the channel bars for supporting a shaft hanger.

2. A machinery support, consisting of an insert for concrete construction, comprising channels disposed parallel to each other with their flanges extending toward each other, bolts extending upward from between the channels, nuts on the bolts above and below the upper flanges on the channels and gripping the same to hold the channels in position, and supporting means carried by the channels.

In testimony whereof I have signed this specification in the presence of two subscribing witnesses.

JULIUS KAHN.

Witnesses:
  E. W. McDONALD,
  H. H. SCOTT.